Oct. 31, 1961     E. H. REPLOGLE     3,006,585
CAPSULE PNEUMATIC SYSTEM FOR AIRCRAFT
Filed Oct. 3, 1958     3 Sheets-Sheet 1

INVENTOR.
Edward H. Replogle
BY Walter H. Popp.
Attorney.

Oct. 31, 1961

E. H. REPLOGLE 3,006,585

CAPSULE PNEUMATIC SYSTEM FOR AIRCRAFT

Filed Oct. 3, 1958

INVENTOR.
Edward H. Replogle
BY
Walter H. Popp.
Attorney.

Oct. 31, 1961  E. H. REPLOGLE  3,006,585
CAPSULE PNEUMATIC SYSTEM FOR AIRCRAFT
Filed Oct. 3, 1958  3 Sheets-Sheet 3

INVENTOR.
Edward H. Replogle
BY
Walter H. Popp.
Attorney.

United States Patent Office 3,006,585
Patented Oct. 31, 1961

3,006,585
CAPSULE PNEUMATIC SYSTEM FOR AIRCRAFT
Edward H. Replogle, Buffalo, N.Y., assignor to Scott Aviation Corporation, Lancaster, N.Y.
Filed Oct. 3, 1958, Ser. No. 765,235
7 Claims. (Cl. 244—140)

This invention relates to a pneumatic system for the ejectable capsule 10 of an aircraft, said system including both the means for moving the actuators 28 and 30 which operate the leg straps, doors etc. of said capsule and also the means for pressurizing the interior of said capsule.

The principal object of the invention is to economize as much as possible on the amount of air which is drawn from the capsule, air-supply tank 17 and, instead, to supply the pneumatic requirements of the capsule as far as possible from the aircraft, air supply tank 15. Another object of the invention is to isolate or separate the high and low pressure sections of the capsule pneumatic system from each other so as to enable the actuators of the doors etc. to be instantly moved under the influence of high pressure air without interfering in any way with the always available low pressure air which is used for pressurization and which can be so used even when the tank pressures have dropped so low as to be unable to move the actuators. Still another object of the invention is to provide a pressure-source selecting regulator 56 which will operate to obtain its required air just as much as possible from the aircraft air supply tank 15 and will also act in the capacity of a first stage regulator so as to not impose too great a variation in pressure on the capsule pressurizing regulator 94 which controls the actual pressure in the capsule 10. Yet another object of the invention is to enable withdrawal of air from the capsule tank 17 when the pressure in the aircraft tank 15 drops too low to be of value in providing pressurization. Another object of the invention is to allow ballistic gases to be vented from the actuators 28 and 30 without allowing these gases to contaminate the pure air in the capsule's pneumatic system. (Ballistic gases are the foul gases resulting from the explosion of cartridges that are sometimes used, in an auxiliary manner, to positively ensure operation of the actuators 28 and 30 in the event of any malfunction of the compressed air system.) Other objects of the invention and practical solutions thereof are explained in the following description and illustrated in the accompanying drawings, wherein:

This invention will be described exactly as it is illustrated but it is to be understood that the breadth of the invention is to be measured solely by its intrinsic novelty and the scope of the appended claims.

*High pressure systems for the actuators 28 and 30*

Figure 1:
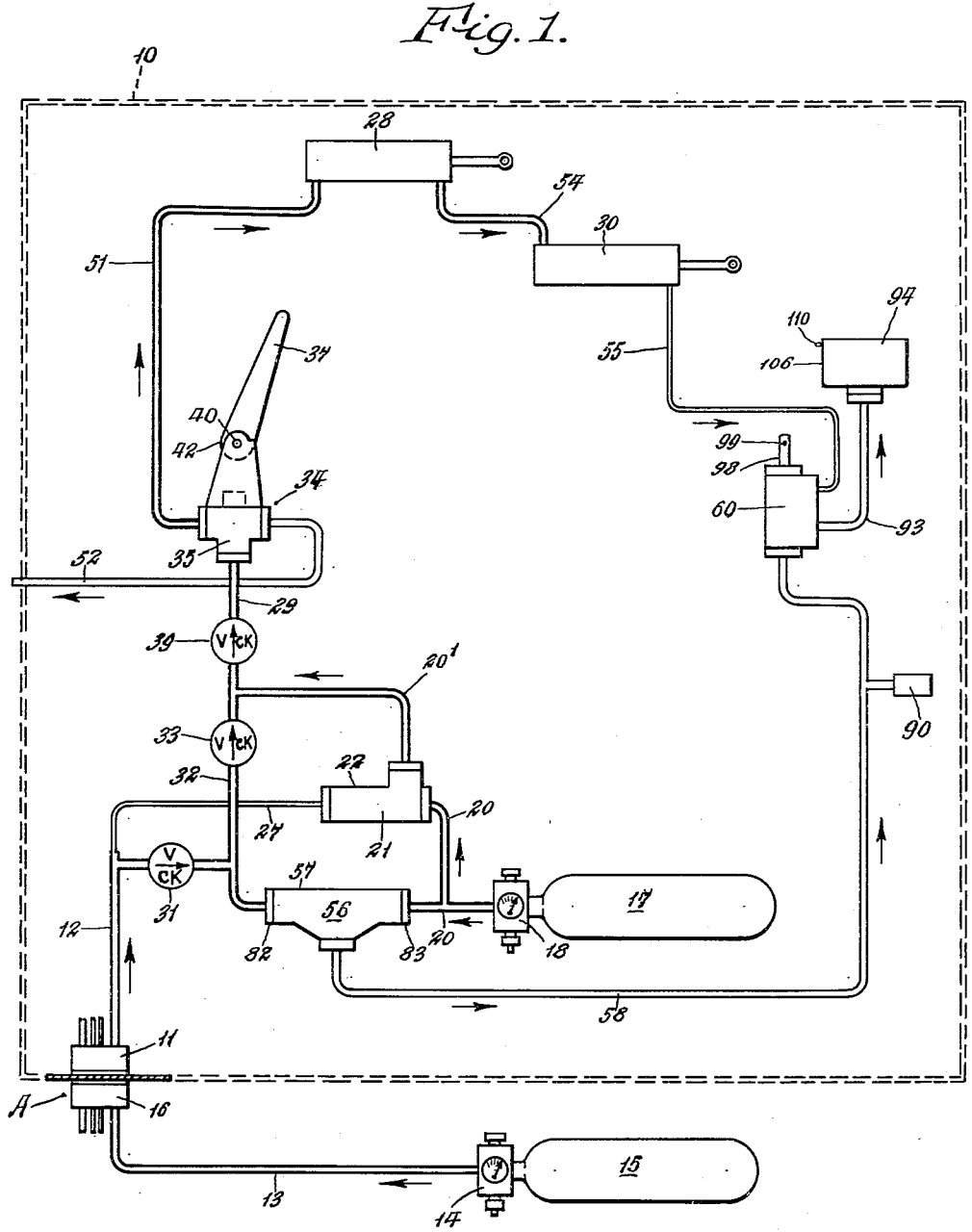
FIG. 1 is a diagrammatic layout, on a diminutive scale, of the complete invention.

We will assume, for convenience, that the aircraft we are dealing with is a one-seat military fighter and that the pilot is the only person with whom we are concerned. When such a pilot is ejected from the aircraft at a very high speed or at a very high elevation, it is highly desirable and frequently absolutely necessary that he be ejected in an air-tight capsule which has been pressurized. Such a capsule is shown diagrammatically by the dotted line, rectangular-shaped capsule 10 in FIG. 1. Secured to the lower wall of this capsule 10 is an upper or capsule coupling segment 11, constituting the upper half of a separable coupling A (see U.S. Patents 2,240,747, 2,699,305, 2,702,680 and 2,302,707). This upper coupling segment 11 has a multitude of various electrical and tubular connections which include an umbilical, air supply pipe 12 which, as long as the coupling A is coupled, communicates thru pipe 13 and gage coupling 14 with an aircraft, air supply tank 15, said pipe 13 being tubularly connected at its upper end with a lower coupling segment 16 which is suitably secured to the aircraft fuselage (not shown). When the capsule 10 is ejected from the airplane (by ballistic or other means) the ends of the pipes 12 and 13, which are connected respectively with the upper and lower coupling segments 11 and 16 of the separable coupling A, are, of course, automatically sealed off by spring loaded valves (not shown) in the usual and well known manner.

Figure 4:
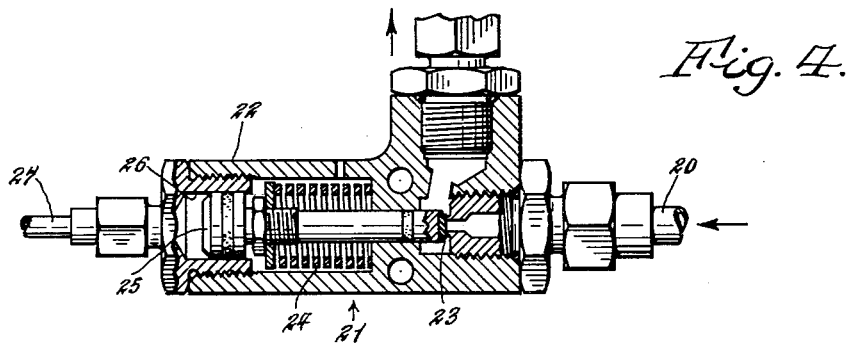
FIG. 4 is a vertical longitudinal section thru the hold back valve 21.

In the capsule 10 is arranged a capsule air supply tank 17, and one of the prime objects of this invention is to conserve the air supply in this tank just as much as possible up to the time said capsule 10 is ejected from the air craft, after which time, of course, said capsule air supply tank 17 becomes the sole source of compressed air. Said capsule air supply tank is tubularly connected thru a gage coupling 18 with a tube which we shall denominate a capsule-tank transfer line 20 that is adapted to convey compressed air from said capsule tank 17 to a hold back valve 21 which latter is shown in detail in FIG. 4. The casing 22 of this hold back valve contains a poppet valve 23 which is urged toward its unseated position by a compression spring 24. Said poppet valve 23 is connected at its left end with a piston 25 which is slidable in a cylinder 26 and allows the valve 23 to move toward its open position (under the influence of the compression spring 24) whenever the pressure in its sensing pilot line 27 (and aircraft air supply tank 15) drops below 2000 p.s.i. When this occurs the high pressure air in line 20 passes up thru this hold back valve 21 and thru an auxiliary capsule-tank, transfer line 20' into an actuation air line 29 and to the actuators 28 and 30.

We will assume that at the start of operations the pressure in both tanks 15 and 17 is approximately 3000 p.s.i. This means that there will be no flow of air from capsule tank 17 until the pressure in the aircraft tank 15 drops to about 2000 p.s.i. This conserves the very high pressure air in capsule tank 17 and enables the air in the aircraft tank 15 to be employed as long as it is capable of furnishing a sufficiently high pressure to positively drive the actuators 28 and 30 which latter are adapted to perform such essential services as pulling tight the pilot's leg straps (not shown), closing the capsule door (not shown), etc.

Figure 2:
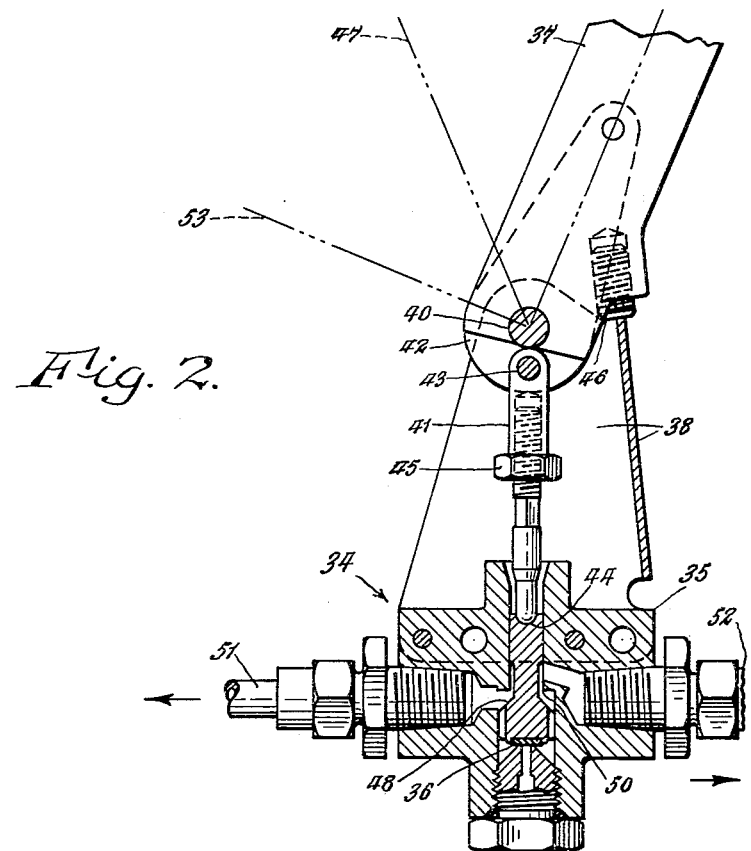
FIG. 2 is a vertical, longitudinal section thru the manually controlled, primary, pre-ejection valve 34.

In the umbilical air supply line 12 leading from the air craft tank 15 is a check valve 31 which prevents air flow under any circumstances from flowing backwardly into the aircraft tank 15. From this check valve 31 the high pressure air emanating from aircraft tank 15 is adapted to flow up thru an aircraft-tank, transfer pipe or line 32, past a check valve 33 and a ballistic gas check valve 39 and thence thru an actuation air line 29 to the lower side of a manually-operated, primary, pre-ejection valve 34 which is shown in detail in FIG. 2.

The casing 35 of this pre-ejection valve 34 contains a poppet valve 36 which closes against the upward flow of air and is restrained from being accidently opened by the air pressure below it, when it is in its closed position (as shown), by being provided with a manual operating handle 37 which is pivoted on the casing bracket 38 on a pivot 40, and also being provided with a valve actuating link 41, which is pivoted on the hub 42 of said handle 37 on a pivot 43. In the closed position shown of this pre-ejection valve 34, this pivot 43 is slightly to the left of a line joining the handle pivot 40 with the center of the hemi-spherical nose 44 that is located at the lower end of the link 41. This ensures that the poppet valve 36 will not be accidently opened by high pressure in the actuation air line 29, and thereby makes this pre-ejection valve 34 a "past-dead-center" type of valve. To ensure that this past-dead-center feature is positive in its action but not too difficult to operate, an adjustment nut 45 is provided to adjust the length of the link 41. In addition to this an adjustable stop 46 is provided to prevent the operating handle 37 from going unduly beyond its past-dead-center position when said handle 37 is in its closed position as shown.

When said handle 37 is moved to its open position, as indicated by the dash-triple-dot line 47, the upper conical part of the poppet valve 36, which conical upper part constitutes a tapered valve 48, seats itself on its valve seat 50. This allows air from actuation air line 29 to freely pass up thru this pre-ejection valve 34 and thru an actuator pipe 51 to the actuators 28 and 30.

When the tapered valve 48 is in its lower position away from its seat 50, any ballistic gases which may happen to be in the actuators 28 and 30 are free to pass from said actuators thru said actuator pipe 51, and thru the space between the tapered valve 48 and its seat 50, and thence out thru overboard pipe 52 to the ambient atmosphere outside the aircraft. (Ballistic gases are the foul gases resulting from the explosion of cartridges that are sometimes used, in an auxiliary manner, to positively ensure operation of the actuators 28 and 30 in the event of any malfunction of the compressed air system.) (The ballistic gas is preferably fired directly into the actuators in a manner not here illustrated.) As the valve 36 is closed in this position, all ballistic gases are prevented from contaminating the air in the actuation air line 29 or in the rest of the high pressure system. Any flow of ballistic gas which might happen to pass back down thru the closed valve 36 is prevented from contaminating the main portion of the high pressure system because of the presence in the actuation air line 29 of the check valve 39.

A certain amount of overtravel of the handle 37 as far as the dash-triple-dot line 53 is permitted so as to allow said handle 37 of the primary pre-ejection valve 34 to be connected to other capsule, cooperating, control members (not shown) without permitting any interference in the movements of the latter by said pre-ejection valve 34. When such overtravel occurs, the tapered valve 48 first moves upwardly to close on its seat 50 and then remains in this closed position while the free hemi-spherical nose 44 of the link 41 continues to rise idly without allowing any further upward movement of said tapered valve 48.

When the pilot decides to eject the capsule 10 from the aircraft, he first pushes the handle 37 of the primary, pre-ejection valve 34 to the left to position 47 so as to open the poppet valve 36 of said primary, pre-ejection valve 34. This actuates the actuators 28 and 30. In doing this his capsule 10 would, under ordinary circumstances, be a component part of the aircraft and be pneumatically connected thereto by the separable coupling A, and hence would be able to use air from the aircraft, air supply tank 15 until its pressure dropped to 2000 p.s.i. If still more very high pressure air is required, the hold back valve 21 opens up and then air under very high pressure is obtained from capsule tank 17, but none of this capsule air can flow into the aircraft tank 15 because of check valve 31. As far as the actuators 28 and 30 are concerned, the only air drained from capsule tank 17 is that needed to furnish whatever additional air is required to cause the actuators to function in a positive fashion until they have arrived at the limit of their motion.

It is important that these actuators 28 and 30 operate in the proper sequence, and hence they are pneumatically arranged in series. By this is meant that no air is received by the secondary actuator 30 until the primary actuator 28 has reached the limit of its motion. At this time the air exhausting from this primary actuator 28 exhausts its air into an exhaust pipe 54 which conveys the compressed air to the secondary actuator 30 which then starts its movement. When this latter actuator finishes its movement, its "exhaust" air does not flow out of the aircraft but builds up a pressure in an "exhaust" pilot tube 55 whose function will be explained later.

*Low pressure system for the capsule pressurizing regulator 94*

Figure 3:
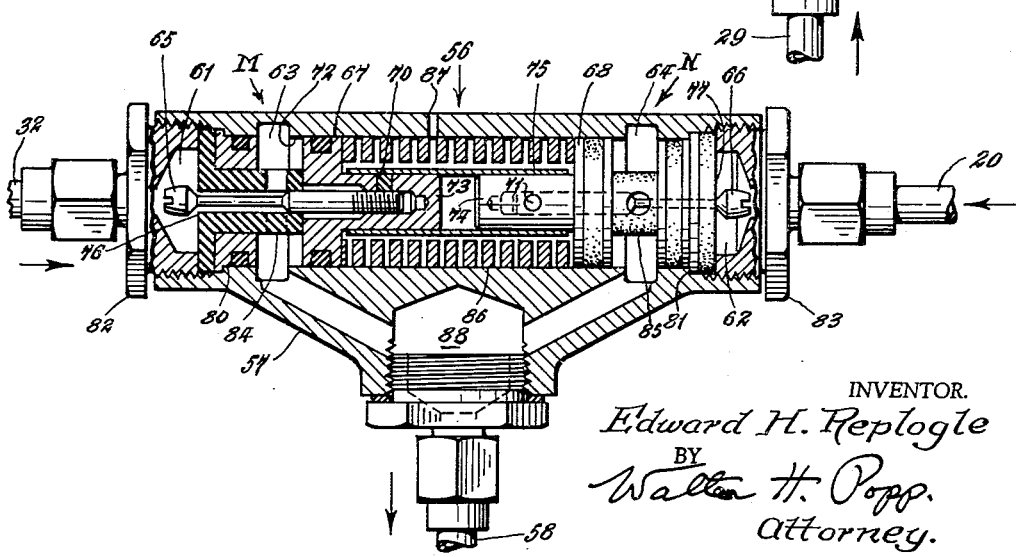
FIG. 3 is a vertical, longitudinal section thru the pressure-source-selecting regulator 56, showing the same in the position it assumes when no pressure has been applied to either of its inlet chambers 61 or 62.

FIG. 3 shows in detail the construction of a pressure-source-selecting regulator 56 having a T-shaped casing 57. The left end of this casing 57 is tubularly connected to the aircraft-tank transfer line 32 and thereby is adapted to receive air from the aircraft, air supply tank 15 so long as the capsule 10 is a part of the aircraft, i.e. until the separable coupling A is separated. The right end of said casing 57 is tubularly connected to the capsule-tank, transfer line 20, and hence is adapted to receive air from the capsule, air supply tank 17. The lower part of said casing 57 is tubularly connected thru a pressurizing air line 58 with the lower end of a secondary, pre-ejection or pressurization control valve 60.

The pressure-source-selecting regulator 56 is of symmetrical construction and its extreme outer ends constitute an aircraft-tank, inlet chamber 61 and a capsule-tank, inlet chamber 62. Inwardly of said inlet chambers 61 and 62 are located a pair of intermediate chambers 63 and 64 which are hermetically sealed off from their companion inlet chambers 61 and 62 except for their companion control valves 65 and 66 which are mechanically and adjustably connected to companion pistons 67 and 68, the adjustment being locked in place by press fitted, nylon plugs 70 and 71 which act in the capacity of set screws. Both of these pistons 67 and 68 are slidably arranged in a cylinder 72 and are provided with inwardly extending hubs 73 and 74, which hubs are slidably received within the bore of a tubular, guidance sleeve 75.

The valves 65 and 66 have companion valve seats 76 and 77 which are clamped against companion, flanged ferrules 80 and 81 by companion threaded heads 82 and 83. The valve seats 76 and 77 are provided with inwardly extending hubs 84 and 85 whose extreme inner ends function as stops to limit the outward movement of their companion pistons 67 and 68. Said pistons are urged resiliently outwardly away from each other by a compression spring 86. The space in which said spring 86 is located is maintained at ambient pressure by a bleed hole 87.

Each valve 65 or 66 closes when its companion piston 67 or 68 moves inwardly against the spring 86 and hence, inasmuch as the area of each piston is larger than the area of its companion valve, it follows that each piston-valve combination, together with the spring 86, acts as an inverse pressure reducing valve M or N. Thus the high pressure in the inlet chamber 61 or 62 is reduced to a low, 270–350 p.s.i. pressure in its companion intermediate chamber 63 or 64 as the case may be. These intermediate chambers are both tubularly connected to an outlet chamber 88 which feeds the low pressure air into the pressurizing air line 58.

The construction of the pressure-source-selecting regulator 56 is such that its outlet chamber 88 normally receives air from whichever of the inlet chambers 61 or 62 has the lowest pressure. This is because the resilient force of spring 86 acts equally in urging both of the valves 65 and 66 toward their open position, and the air pressure against the outside of both pistons 67 and 68 is the same, whereas the pressure against whichever valve 65 or 66 that has the lowest inlet pressure is least able to counteract the force of the spring 86 and therefore cracks open first. The moment this happens the air pressure in outlet chamber 88 climbs to a higher point than could have been reached if the other valve 66 had cracked open first. This is because the air pressure in the inlet chamber 62 is higher than that in inlet chamber 61. It is axiomatic that in any fluid pressure regulator of the inverse type, the lower the inlet pressure the higher the regulated pressure. Hence the regulated pressure in outlet chamber 88 is higher when valve 65 starts to regulate the relatively lower pressure from its inlet compartment 61, then the pressure in said outlet chamber 88 would be if the valve 66 had started to regulate the relatively higher pressure from its inlet compartment 62. The result of this is that a relatively high pressure is exerted on piston 68 and this holds valve 66 firmly on its seat, this holding force being, of course, augmented by the very high pressure exerted against the valve 66 itself. It should also be noted that the pressure against piston 68 increases as the pressure in the inlet chamber 61 decreases. This is because in an ordinary, inverse type, pressure regulator, such as here illustrated at M and N in FIG. 3, its inlet pressure is inversely proportional to its regulated pressure.

As the aircraft tank 15 becomes depleted, the pressure in the inlet chamber 61 drops to such a low pressure that the spring 86 is able to open the valve 65 wide to the position shown in FIG. 3. The pressure in the outlet compartment 88 then continues to drop until its pressure drops to the regulating pressure of valve 66 which thereupon starts to regulate. At no time, however, does any air pass backwardly into aircraft supply tank 15 because of check valve 31.

Figure 6:
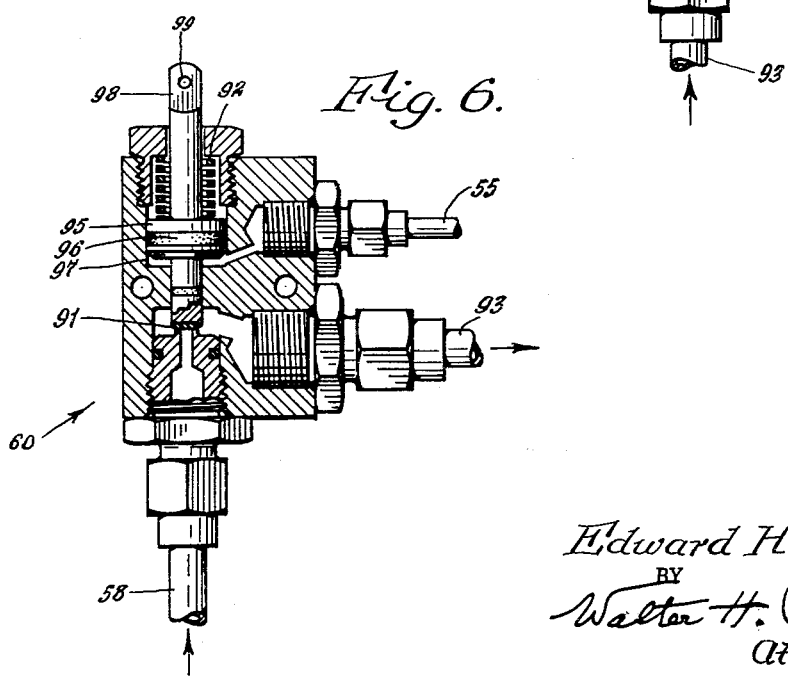
FIG. 6 is a vertical longitudinal section thru the secondary, pre-ejection or pressurization control valve 60.

Pressurized air at low pressure flows from the pressurizing air line 58, past a relief or safety valve 90 to aforesaid, pressurization valve or secondary, pre-ejection valve 60 (shown in detail in FIG. 6). The latter is provided with a poppet valve 91 which, in the position shown in said FIG. 6, is held down in its closed position by a compression spring 92 so that under these conditions no air flows past said poppet valve 91 and up thru the final, pressurizing pipe 93 into the capsule pressurizing regulator 94.

The poppet valve 91 is mechanically connected with a piston 95 provided with an O ring 96 and slidably arranged in a cylinder 97. The space in said cylinder 97 located below said piston 95 communicates with aforementioned exhaust pilot tube 55. This means, as far as the automatic operation is concerned, that the secondary, pre-ejection or pressurization valve 60 stays in the closed position illustrated until both of the series-arranged actuators 28 and 30 have been moved to the end of their travel, and after sufficient air pressure from said pilot tube 55 has been built up to push up the piston 95 and to open the poppet valve 91. If some foreign object should interfere with the members (not shown) which are normally actuated by the actuators 28 and 30 or if something else prevents said actuators from traveling to the full limit of their movement, the pilot of the aircraft may decide that his best bet is not to try to cure the trouble but, instead, to start pressurizing the capsule 10 immediately, and then to eject said capsule in the condition it happens to be. For this purpose, the secondary, pre-ejection valve 60 is provided with a manually-actuatable rod 98 whose lower end is integrally connected with the piston 95 and whose upper end is laterally drilled at 99 to enable it to be mechanically connected with whatever emergency lever (not shown) is provided for the pilot's use.

Figure 5:
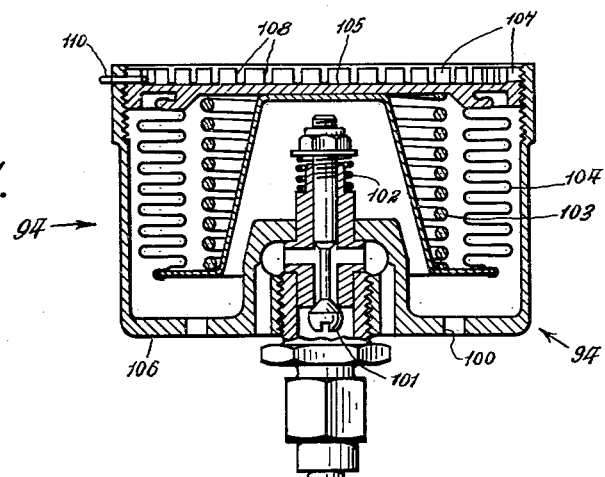
FIG. 5 is a vertical longitudinal section thru the capsule pressurizing regulator 94.

Low pressure air from the secondary, pre-ejection valve 60 passes up thru the final, pressurizing pipe 93 into the pressurizing regulator 94 shown in detail in FIG. 5. This regulator functions as a second-stage, pressure-reducing valve that is controlled by an aneroid 104 whose outer surface is subjected to the ambient pressure existing in the capsule 10 thru the drilled holes 100. The pressure regulating valve 101 of this regulator 94 is urged toward its closed position by the light spring 102 (so as to prevent chattering) and is urged toward its open position by the heavy compression spring 103 which is located within the aneroid 104. However, this heavy spring 103 can only open the pressure regulating valve 101 when the pressure within the casing 106 of said pressure regulator (and in the capsule 1) drops low enough to allow said heavy spring 103 to function. When the pressure within the capsule 10 is too low, the heavy spring 103 opens the valve 101 and allows low pressure air to flow out from the final pressurizing pipe 93, thru the valve 101 and thence into the interior of the capsule 10. Adjustment of the heavy spring 103 is effected by having the cover 105 of this capsule pressurizing regulator 94 screw threaded into its casing 106, and providing the up-turned flange 107 of said cover 105 with an annular row of peripheral notches 108, any one of which is adapted to receive a cotter pin 110.

I claim:

1. A capsule pneumatic system in combination with an aircraft capsule and an aircraft having an aircraft air supply tank and comprising: a capsule air supply tank arranged in said capsule; an aircraft-tank pressure regulator supplied by air from said aircraft supply tank and discharging into an outlet chamber; a capsule-tank pressure regulator supplied by air from said capsule supply tank and also discharging into said outlet chamber; and a capsule pressurizing regulator tubularly connected with said outlet chamber.

2. A capsule pneumatic system as in claim 1 with a single compression spring actuating both pressure regulators.

3. A capsule pneumatic system as in claim 1 with each pressure regulator being of the inverse type.

4. A capsule pneumatic system as in claim 1 with a pre-ejection actuator tubularly connected to both the inlet of the aircraft-tank pressure regulator and the outlet of a hold back valve that is controlled by the pressure in the aircraft tank; and a capsule tank transfer line tubularly connecting the inlet of the capsule-tank pressure regulator and the inlet of said hold back valve.

5. A capsule pneumatic system in combination with a capsule and an aircraft air supply tank and comprising: a capsule tank; a selective pressure source regulator having an outlet and a pair of inlets each of the latter being connected to one of said tanks and both of which are connected to a primary pre-ejection valve which controls the flow of air to an actuator; a secondary pre-ejection valve connected to the outlet of said selective pressure regulator and controlled by the pressure of the exhaust from said actuator; and a pressurizing regulator connected to the outlet of said secondary pre-ejection valve.

6. A capsule pneumatic system in combination with a capsule and an aircraft air supply tank and comprising: a capsule tank; a selective pressure source regulator having a pair of inlets and an outlet; a manually-controlled, primary, pre-ejection valve connected to one of said inlets thru an aircraft tank transfer line that receives air from the aircraft tank; a capsule tank transfer line connecting the other inlet of said selective regulator to a hold back valve and thence to said primary pre-ejection valve, said hold back valve being controlled by the pressure in the aircraft tank; an actuator connected to the outlet of the primary pre-ejection valve; a pressurization valve connected to the outlet of the selective pressure regulator and controlled by the pressure of the exhaust from the actuator; and a pressurizing regulator connected to the outlet of said pressurization valve.

7. A capsule pneumatic system in combination with a capsule and an aircraft air supply tank and comprising:

a capsule air supply tank arranged in said capsule; a separable coupling consisting of an aircraft coupling segment attached to an aircraft and a capsule coupling segment attached to said capsule; an aircraft air supply tank connected with said aircraft coupling segment; a pressure-source-selecting regulator casing having a cylinder and an outlet and a pair of inlet chambers and also a pair of intermediate chambers arranged inwardly of said inlet chambers and communicating with said outlet of said pressure source selecting regulator casing; a control valve arranged between each inlet chamber and its companion intermediate chamber; a pair of coaxial pistons arranged in the cylinder of said selecting regulator casing and each secured to one of said control valves, and each having a coaxial, inwardly extending hub; a single, tubular, alignment sleeve embracing both of said hubs; a compression spring arranged between said pistons; an actuator; a manually actuated, past-dead-center, primary, pre-ejection valve which opens against the flow of air and in its closed position vents said actuator overboard; an aircraft tank transfer line connecting the aircraft coupling segment with said primary pre-ejection valve and also with the one inlet of the pressure source selecting regulator casing; a capsule tank transfer line connecting the other inlet of said selecting regulator casing with said capsule air supply tank and also with a hold back valve which is controlled by the pressure in the aircraft tank; a tubular connection between the outlet of said hold back valve and the primary pre-ejection valve; a tubular connection between said primary pre-ejection valve and the inlet of the actuator; a secondary, pre-ejection, pressurization valve connected to the outlet of the selecting regulator casing and controlled by the pressure of the exhaust from said actuator; and a capsule pressurizing regulator connected to the outlet of said pressurization valve and venting into the capsule.

References Cited in the file of this patent

UNITED STATES PATENTS

| | | |
|---|---|---|
| 2,240,747 | Babb et al. | May 6, 1941 |
| 2,302,707 | Mejean | Nov. 24, 1942 |
| 2,699,305 | Turner et al. | Jan. 11, 1955 |
| 2,702,680 | Heinemann et al. | Feb. 22, 1955 |
| 2,813,690 | Holmes | Nov. 19, 1957 |

FOREIGN PATENTS

| | | |
|---|---|---|
| 534,524 | Great Britain | Mar. 10, 1941 |